US008707447B2

(12) United States Patent
Mizutani

(10) Patent No.: US 8,707,447 B2
(45) Date of Patent: Apr. 22, 2014

(54) LICENSE REGISTRATION DEVICE THAT REGISTERS LICENSE FOR USE OF PROGRAM ON DATA PROCESSING DEVICE

(75) Inventor: Norio Mizutani, Mie-ken (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 445 days.

(21) Appl. No.: 12/685,981

(22) Filed: Jan. 12, 2010

(65) Prior Publication Data

US 2010/0251389 A1    Sep. 30, 2010

(30) Foreign Application Priority Data

Mar. 26, 2009   (JP) ................................ 2009-076793

(51) Int. Cl.
*G06F 21/00*   (2013.01)

(52) U.S. Cl.
USPC .............................................. 726/27; 726/30

(58) Field of Classification Search
USPC .................. 709/220–222; 726/4–7, 27–30
See application file for complete search history.

(56) References Cited

U.S. PATENT DOCUMENTS

| 6,009,401 A | 12/1999 | Horstmann | |
|---|---|---|---|
| 2002/0107809 A1* | 8/2002 | Biddle et al. | 705/59 |
| 2002/0120578 A1* | 8/2002 | Sy | 705/59 |
| 2002/0143568 A1* | 10/2002 | Nakamura et al. | 705/1 |
| 2002/0144136 A1* | 10/2002 | Stornetta et al. | 713/200 |
| 2003/0225843 A1 | 12/2003 | Sakata | |
| 2004/0205261 A1* | 10/2004 | Osada | 710/8 |
| 2005/0085220 A1* | 4/2005 | Benco et al. | 455/414.1 |
| 2005/0246537 A1* | 11/2005 | Gunyakti et al. | 713/176 |
| 2006/0066907 A1* | 3/2006 | Nakata et al. | 358/3.1 |
| 2007/0067301 A1* | 3/2007 | Malik | 707/10 |
| 2007/0150417 A1* | 6/2007 | Hu | 705/59 |
| 2008/0163336 A1 | 7/2008 | Feng et al. | |
| 2008/0215468 A1* | 9/2008 | Monsa-Chermon et al. | 705/34 |
| 2009/0150293 A1* | 6/2009 | Yen et al. | 705/59 |
| 2009/0228982 A1* | 9/2009 | Kobayashi | 726/26 |
| 2009/0253414 A1* | 10/2009 | Gosselin et al. | 455/414.1 |

FOREIGN PATENT DOCUMENTS

| JP | 10-40098 | 2/1998 |
|---|---|---|
| JP | 10-143363 | 5/1998 |
| JP | 2003-84852 | 3/2003 |
| JP | 2003-271531 | 9/2003 |
| WO | WO 2006/028279 A1 | 3/2006 |
| WO | WO 2007/146940 A2 | 12/2007 |

OTHER PUBLICATIONS

Extended European Search Report dated Apr. 5, 2011 from related EPO 10150690.5.

* cited by examiner

*Primary Examiner* — Chau Le
(74) *Attorney, Agent, or Firm* — Scully, Scott, Murphy & Presser, P.C.

(57) ABSTRACT

A storage medium storing a set of program instructions that becomes executable on a data processing device if license information is input to the data processing device within a limiting period set for the license information. The license information is provided by a license registration device after registration of a license for use of the program instructions on the data processing device. The instructions includes storing time information in association with the license information, the time information indicating a cancelable time that arrives at or after an expiration time of the limiting period, accepting input of a disabling command, disabling use of the program instructions, and providing, if the cancelable time has arrived and if the disabling command has been accepted, license cancel information necessary for canceling the license.

14 Claims, 9 Drawing Sheets

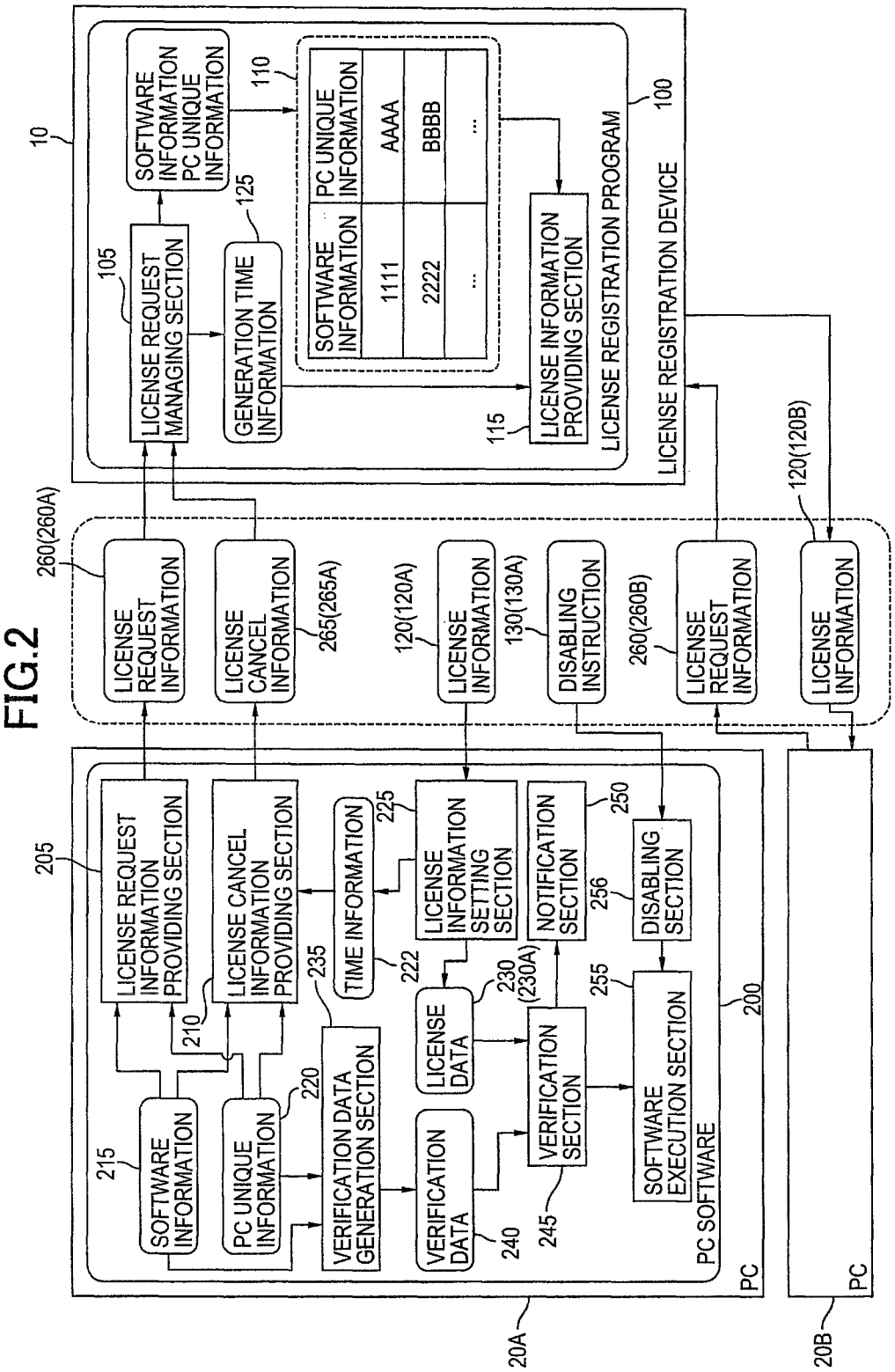

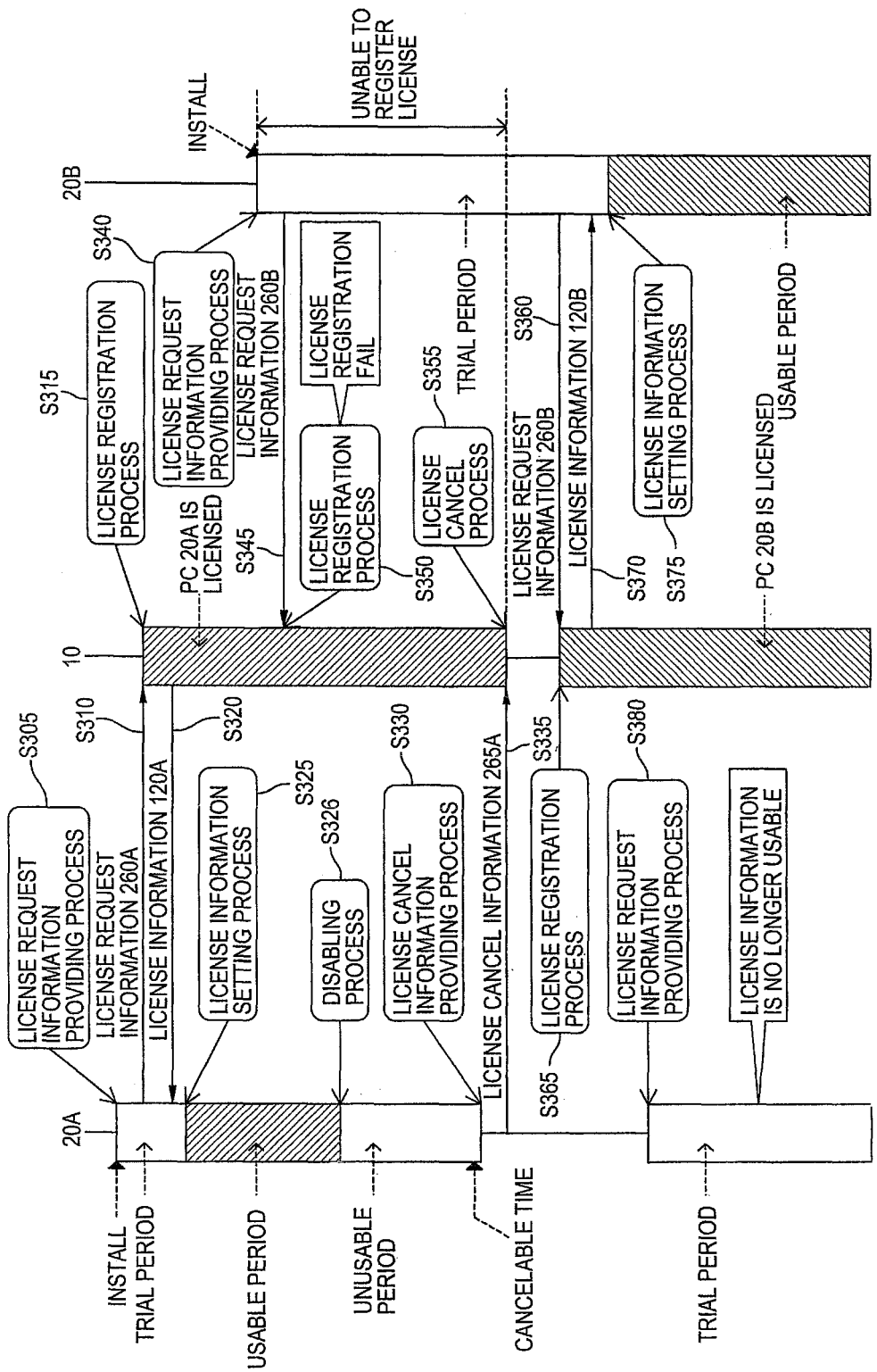

LICENSE REGISTRATION DEVICE THAT REGISTERS LICENSE FOR USE OF PROGRAM ON DATA PROCESSING DEVICE

CROSS REFERENCE TO RELATED APPLICATION

This application claims priority from Japanese Patent Application No. 2009-076793 filed Mar. 26, 2009. The entire content of this priority application is incorporated herein by reference.

TECHNICAL FIELD

The present invention relates to a program usable on an image processing device and a license registration device for registering a license for use of the program.

BACKGROUND

There have been proposed various methods for preventing misuse of software. One of the methods commonly used in recent years is that a personal computer (PC) or the like communicates with a license registration device to obtain a license for use of software at the time of installation of the software on the PC.

There may be a case where a user who purchased software and obtained a license for the software sells the software as secondhand software to a different user. There is proposed a method to issue a license for use of such secondhand software on a PC in an on-line state.

SUMMARY

However, in the above-described method, licenses may not be fully managed because a license registration device cannot learn the status of software installed on PCs in an off-line state. For example, after obtaining a license for use of software installed on a first PC, a user can uninstall the software and obtain a license for use of the same software on a second PC differing from the first PC. Then, the user can re-install the same software on the first PC and make the software usable on the first PC by using the license obtained when the software was installed on the first PC for the first time. As a result, the user can use the same software on both the first and the second PCs.

It is an object of the invention to provide a program and a license registration device capable of preventing misuse of software on such device as a personal computer.

In order to attain the above and other objects, the invention provides a storage medium storing a set of program instructions executable on a data processing device, usable for controlling the data processing device, and becoming executable on the data processing device under a condition where license information is input to the data processing device within a limiting period set for the license information. The license information is provided by a license registration device after registration of a license for use of the program instructions on the data processing device. The instructions includes: storing time information in association with the license information, the time information indicating a cancelable time that arrives at or after an expiration time of the limiting period; accepting input of a disabling command; disabling use of the program instructions upon accepting the input of the disabling command; and providing, if the cancelable time has arrived and if the disabling command has been accepted, license cancel information necessary for canceling the license.

According to another aspect, the present invention provides a license registration device including a first receiving section, a license registration section, a setting section, a license information generation section, a providing section, a second receiving section, and a cancel section. The first receiving section accepts input of license request information. The license registration section registers a license for use of program instructions relating to the license request information in accordance with a license registration status of the program instructions. The setting section sets a limiting period. The license information generation section generates license information indicating successful registration of the license. The license information includes the limiting period. The providing section provides the license information to a user. The program instructions can become executable on a data processing device if the license information is input to the data processing device within the limiting period. The second receiving section accepts input of license cancel information. The cancel section cancels the license in response to the license cancel information.

BRIEF DESCRIPTION OF THE DRAWINGS

The particular features and advantages of the invention as well as other objects will become apparent from the following description taken in connection with the accompanying drawings, in which:

FIG. 2 is a block diagram showing PC software and a license registration program according to the embodiment of the present invention;

FIG. 3 is a timing chart representing a license registration executed in relation to a license registration according to the embodiment of the present invention;

DETAILED DESCRIPTION

A license registration device according to an embodiment of the present invention will be described while referring to the accompanying drawings.

Figure 1A:
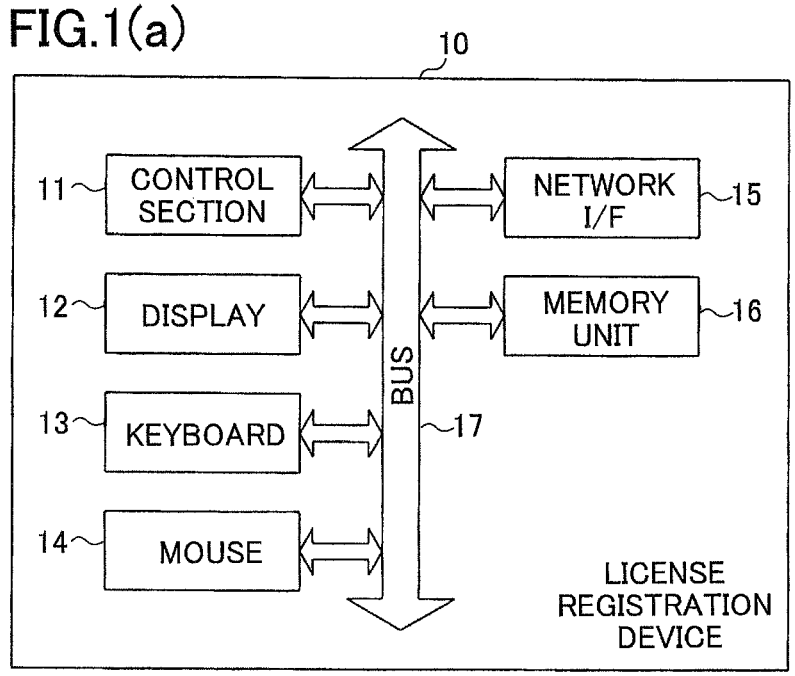
FIG. 1(a) is a block diagram showing a hardware structure of a license registration device according to an embodiment of the present invention.

First, a hardware structure of a license registration device 10 of the present embodiment will be described with reference to FIG. 1. The license registration device 10 has the same configuration as well-known personal computers (PCs). That is, the license registration device 10 includes a control section 11, a display 12, a keyboard 13, a mouse 14, a network interface (I/F) 15, and a memory unit 16, all connected to one another via a bus 17. The control section 11 includes a microcomputer having a CPU, a ROM, a RAM, and an I/O, all connected to one anther via a bus line. The memory unit 16 includes a nonvolatile memory, such as a hard disk or a flush memory, for storing various programs and data.

Figure 1B:
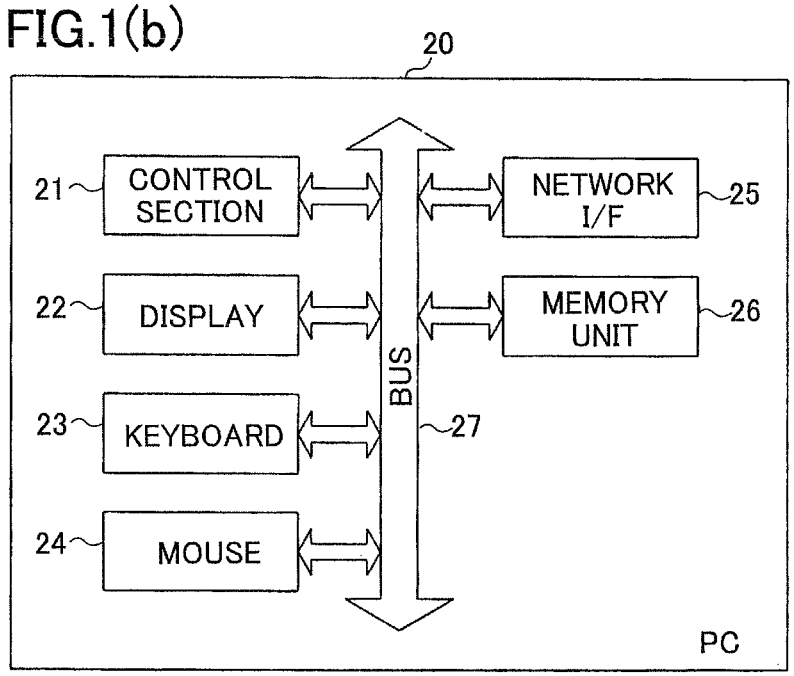
FIG. 1(b) is a block diagram showing a hardware structure of a personal computer on which a program according to the embodiment of the present invention is installed.

Next, a configuration of each of PCs 20 (PC 20A and PC20B shown in FIG. 2) will be described. The PCs 20 have substantially the same hardware structure as the license registration device 10. That is, as shown in FIG. 1(b), each PC 20 includes a control section 21, a display 22, a keyboard 23, a mouse 24, a network interface (I/F) 25, and a memory unit 26, all connected to one another via a bus 27. The control section 21 includes a microcomputer having a CPU, a ROM, a RAM, and an I/O, all connected to one anther via a bus line. The memory unit 26 includes a nonvolatile memory, such as a hard disk or a flush memory, for storing various programs and data.

The PCs 20 are not necessarily connected to the Internet, and may be in the off-line states.

Next, software structures of the license registration device 10 and the PC 20A will be described with reference to FIG. 2. FIG. 2 shows a configuration of license registration program 100 installed on the license registration device 10 and a configuration of PC software 200 installed on the PC 20A. It should be noted that the license registration device 10 and each of the PCs 20 do not directly communicate with each other. An on-line terminal (not shown), but not the PCs 20, exchanges data with the license registration device 10. That is, a user of each PC 20 sends data to and receives data from the license registration device 10 through the on-line terminal other than the PCs 20.

The PC software 200 will be described first. The PC software 200 includes a license request information providing section 205, a license cancel information providing section 210, a license information setting section 225 a verification data generation section 235, a verification section 245, a notification section 250, and a software execution section 255.

The license request information providing section 205 is for providing a user with license request information 260 for the PC 20A (hereinafter referred to as "license request information 260A"). The license cancel information providing section 210 is for providing the user with license cancel information 265 for the PC 20A (hereinafter referred to as "license cancel information 265A"). The license information setting section 225 is for generating license data 230 for the PC 20A (hereinafter referred to as "license data 230A") and time information 222 based on license information 120 for the PC 20A (hereinafter referred to as "license information 120A").

The verification data generation section 235 is for generating verification data 240. The verification section 245 is for verifying the license data 230A against the verification data 240. The notification section 250 is for notifying the user that the user is not licensed when the user is determined not to be licensed for use of the PC software 200 as a result of the verification by the verification section 245. The software execution section 255 is for executing the PC software 200 when the user is determined to be licensed as the result of the verification.

More specifically, the license request information providing section 205 generates the license request information 260A and provides the same to the user. The license request information 260A is used for requesting the license registration device 10 to register a license for use of the PC software 200, and includes encrypted software information and encrypted PC unique information. The license request information 260A also includes reference time information relating to the license request information 260A. The reference time information may be information indicating the time at which the license request information 260A is generated or the time at which the PC software 200 is installed on the PC 20A, for example.

The license cancel information providing section 210 generates the license cancel information 265A and provides the same to the user. The license cancel information 265A is used for requesting cancellation of the license for use of the PC software 200 on the PC 20A registered by the license registration device 10. The license cancel information 265A is generated when or after cancelable time indicated by the time information 222 has arrived after the PC software 200 was installed on the PC 20A. The license cancel information 265A includes encrypted software information (215) and encrypted PC unique information (220).

The license information setting section 225 accepts input of the license information 120A, generates the license data 230A and the time information 222 based on the license information 120A, and stores the same into the memory unit 26 (FIG. 1(b)). The license data 230A is data that is required for using the PC software 200 on the PC 20A.

The verification data generation section 235 generates the verification data 240 based on software information 215 and PC unique information 220 both stored in the memory unit 26 (FIG. 1(b)). The software information 215 is such information as a license identification (ID) uniquely allocated to the PC software 200. A user may input the software information 215 when installing the PC software 200, or the software information 215 may be included in the PC software 200. The PC unique information 220 is information for identifying the PC 20A. For example, the PC unique information 220 may be a serial number or a MAC address allocated to the PC 20A. Alternatively, the PC unique information 220 may be a version number of an operation system (OS) installed on the PC 20A, time and date at which the OS was installed, a license ID of the OS, or information generated based on any of these information.

The verification section 245 activates the verification data generation section 235 to generate the verification data 240 when the PC software 200 installed on the PC 20A is activated, compares the license data 230A to the verification data 240, and determines whether or not to permit the execution of the PC software 200. More specifically, if the license data 230A matches the verification data 240, then the verification section 245 permits the execution of the PC software 200 and starts the operation of the software execution section 255. However, if the license data 230A is not stored in the memory unit 26 or if the license data 230A does not match the verification data 240, then the verification section 245 prohibits the execution of the PC software 200 and notifies the user through the notification section 250 that the user is not allowed to use the PC software 200.

However, the verification section 245 automatically authorizes the execution of the PC software 200 without performing the above-described verification process in a trial period.

The PC software 200 further includes a disabling section 256 that accepts input of a disabling instruction 130 for the PC 20A (hereinafter referred to as "disabling instruction 130A") and disables usage of the PC software 200 on the PC 20A when the user inputs the disabling instruction 130. The disabling section 256 disables the usage by changing internal settings of the PC software 200 to prevent the software execution section 255 from executing the PC software 200. Note that the disabling instruction 130A may be an uninstall instruction for uninstalling the PC software 200 from the PC 20A. However, in this case also, the PC software 200 is not actually uninstalled, but is simply disabled to be used.

Next, a configuration of the license registration program 100 installed on the license registration device 10 will be described. The license registration program 100 includes a license request managing section 105 and a license information providing section 115. The license request managing section 105 is for registering and canceling a license for use of PC software on any of the PCs 20. The license information providing section 115 is for providing a user with the license information 120. The memory unit 16 (FIG. 1(a)) of the license registration device 10 stores a license managing table 110.

More specifically, the license request managing section 105 accepts input of the license request information 260 and decrypts the encrypted PC unique information (220) and software information (215) included in the license request information 260. Then, the license request managing section 105 registers the decrypted PC unique information on the license managing table 110 in association with pre-registered software information. In this manner, the license request managing section 105 registers a license for use of PC software on the PC 20 (the PC software 200 on the PC 20A, for example). The license request managing section 105 also generates a generation time information 125 based on the license request information 260 and inputs the same to the license information providing section 115. The generation time information 125 may indicate the time that the reference time information included in the license request information 260 indicates, the time at which the license request managing section 105 has accepted the input of the license request information 260, or the time at which the license request managing section 105 has registered the PC unique information on the license managing table 110.

The license request managing section 105 also accepts input of the license cancel information 265 and decrypts the encrypted PC unique information and software information included in the license cancel information 265. If the decrypted software information matches software information currently registered on the license managing table 110 in association with PC unique information that the decrypted PC unique information matches, then the license request managing section 105 deletes the PC unique information corresponding to the decrypted software information from the license managing table 110.

The license information providing section 115 generates the license information 120 based on the decrypted software information, the decrypted PC unique information, and the generation time information 125. The license information 120 is a proof that a license for use of the PC software on the PC 20 has been registered. The license information 120 includes encrypted PC unique information, encrypted software information, and expiration information indicating a limiting period that is set based on the generation time information 125. Then, the license information 120 is provided to the user of the PC 20.

The license managing table 110 is a table for storing the software information 215 of the PC software, such as the PC software 200, and the PC unique information 220 of the PC 20 (such as the PC 20A) in correspondence with each other. Software information 215 of each PC software to be sold is pre-registered on the license managing table 110, and after installed on one of the PCs 20, PC unique information 220 of the PC 20 is registered, in a license registration process (described later), on the license managing table 110 in association with the software information 215 of the installed PC software.

Only a predetermined number of PCs 20 can be registered for the same PC software, and the same number of entries of PC unique information 220 as the predetermined number of PCs 20 can be registered on the license managing table 110 in association with the same software information 215 pre-registered on the license managing table 110. Thus, if the predetermined number of PCs 20 are already registered for particular PC software, no more PC 20 can be registered for this PC software. In this embodiment, only one PC 20 can be registered for the same PC software.

Note that PC software installed on the PC 20B has the same configuration as the PC software 200, and generates the license request information 260 for the PC 20B (hereinafter referred to as "license request information 260B") that is used when requesting the license registration device 10 to register a license for use of the PC software on the PC 20B, and accepts input of the license information 120 for the PC 20B (hereinafter referred to as "license information 120B") as a proof that the PC 20B is licensed for the use of the PC software.

Next, processes executed in the license registration device 10 and the PCs 20 will be described with reference to the timing chart of FIG. 3.

When PC software allocated with a license ID is installed on the PC 20A, a license request information providing process to be described later is performed in the PC 20A to provide the license request information 260A to a user of the PC 20A (hereinafter referred to also as "user A") by, for example, displaying the same on the display 22 of the PC 20A (S305). Note that the PC software may have a trial period in which anyone can use the PC software without a license. This trial period enables use of the PC software during the time between when the PC software is first installed and when the license registration completes.

Then, the user A inputs the license request information 260A to an online terminal (not shown) and transmits the same to the license registration device 10 via the Internet or the like (S310). Note that the user A may alternatively send a storage medium storing the license request information 260A to a manager of the license registration device 10 to have the manager input the license request information 260A to the license registration device 10.

Upon receiving the license request information 260A, the license registration device 10 executes a license registration process to be described later (S315) to register a license for use of the PC software on the PC 20A. Then, the license registration device 10 generates the license information 120A to prove that the PC 20A is licensed to use the PC software and sends the same to a transmitter of the license request information 260A (S320). Alternatively, the manager of the license registration device 10 may send a storage medium storing the license information 120A to the user A, for example.

After receiving the license information 120A, the user A inputs the license information 120A to the PC 20A. As a result, the PC 20A performs a license information setting process to be described later (S325). As a result of the license information setting process, the license data 230A (FIG. 2) is generated for the PC software (PC software 200) on the PC 20A. Note that the license information 120A includes the expiration information indicating the limiting period as described above, and the license data 230A is generated only if the license information 120A is input within the limiting period. In other words, the PC software 200 becomes executable on the PC 20A only if the license information 120A is input within the limiting period.

From this time on, until usage of the PC software 200 on the PC 20A is disabled, the license data 230A is verified each time before executing the PC software 200, and the PC software 200 is executed only if the verification succeeds.

When the user A inputs the disabling instruction 130A to the PC 20A, then the disabling section 256 executes a disabling process for disabling the usage of the PC software 200 on the PC 20A (S326), so the PC software 200 becomes unusable on the PC 20A. However, even if the PC software 200 becomes unusable, the license for use of the PC software 200 on the PC 20A remains registered at the license registration device 10. Thus, even if the same PC software is installed on a different PC 20, the different PC 20 cannot be licensed for use of the PC software. Also, if the PC software 200 becomes unusable, part of the PC software 200 (equivalent to the license cancel information providing section 210 described above) remains executable on the PC 20A.

When the cancelable time indicated by the time information 222 has arrived, a license cancel information providing process (described later) is performed to provide the license cancel information 265A to the user A (S330). Then, the user A sends the license cancel information 265A to the license registration device 10 from the online terminal (S335). Upon receiving the license cancel information 265A, the license registration device 10 performs a license cancel process to be described later to cancel the license for use of the PC software 200 on the PC 20A (S355). As a result, the license registration device 10 becomes capable of registering a license for use of the PC software on a different PC 20 based on license request information 260 form the different PC 20.

When PC software allocated with the same license ID with that allocated to the PC software 200 installed on the PC 20A is installed on the PC 20B, the license request information providing process is performed in the PC 20B (S340). As a result, the license request information 260B is provided to a user of the PC 20B (hereinafter referred to as "user B"). At this time also, a trial period is set.

Upon receiving the license request information 260B (S345), the license registration device 10 performs the license registration process (S350). However, if the PC 20A has already been licensed to use the PC software 200, use of the PC software installed on the PC 20B is not permitted and thus the license registration fails. However, if the license request information 260B is sent to the license registration device 10 after the license for use of the PC software 200 on the PC 20A has been canceled (S360), the license registration process is performed in the license registration device 10 (S365), and then the license registration for the PC 20B succeeds this time. That is, use of the PC software on the PC 20B is permitted. Then, the license registration device 10 generates the license information 120B for the PC 20B that proves that the PC 20B is licensed and provides the same to the user B (S370).

When the user B having received the license information 120B inputs the license information 120B to the PC 20B, the PC 20B performs the license information setting process (S375). Note that the license information 120B also includes the expiration information indicating the limiting period, and the license information setting process is performed only if the PC 20B receives the license information 120B within the limiting period. As a result of the license information setting process, the license data 230 is set for the PC software installed on the PC 20B.

If the PC software allocated with the same license ID is installed on the PC 20A again after the license for use of the PC software 200 on the PC 20A has been cancelled, then the license request information providing process is performed in the PC 20A (S380) to provide the license request information 260A to the user A. Upon receiving the license request information 260A, the license registration device 10 performs the license registration process. However, because the license for use of the PC software on the PC 20B has been registered, use of the PC software on the PC 20A is not permitted this time. Even if the user A inputs the previously obtained license information 120A to the PC 20A, the license data 230A is not set because the limiting period indicated by the expiration information included in the license information 120A has already elapsed at the time of when the license cancel information 265A was sent to the license registration device 10.

Next, the license request information providing process will be described with reference to the flowchart of FIG. 4. The license request information providing process is executed when PC software is installed on the PC 20. For example, the license request information providing process is executed in S305, S340, and S380 in the timing chart of FIG. 3. In the following, the license request information providing process executed in the PC 20A in S305 upon installation of the PC software will be described as a representative.

Figure 4:
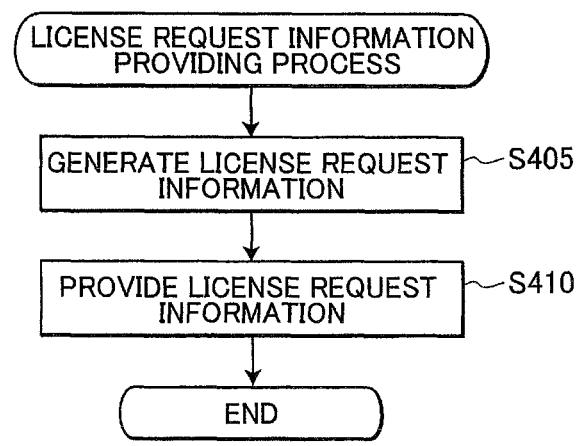
FIG. 4 is a flowchart representing a license request information providing process according to the embodiment of the present invention.

As shown in FIG. 4, in S405 of the license request information providing process, the control section 21 of the PC 20A generates the license request information 260A. Then, in S410, the control section 21 provides the same to the user A, and ends the license request information providing process. The license request information 260A my be provided to the user A in S410 by storing the same into a storage area of the memory unit 26 accessible to the user A or by displaying the same on the display 22, for example.

As described above, the license request information 260A includes the encrypted software information, the encrypted PC unique information, and the reference time information.

Note that the license request information providing process is not necessarily executed upon installation of the PC software, but may be executed when the license request information is requested by the user A after installation of the PC software or when the user inputs an activation command for the PC software.

Next, the license registration process will be described with reference to the flowchart of FIG. 5. The license registration process is executed by the control section 11 (FIG. 1(*a*)) of the license registration device 10 for register a license for use of PC software on the PC 20 when the license registration device 10 starts receiving the license request information 260. For example, the license registration process is executed in S315, S350, and S365 of the timing chart of FIG. 3. The license request information 260 may be received from an online terminal through the network I/F 15 or may be inputted by the manager or the like through manipulation of the license registration device 10, for example. In the following, the license registration process executed in S315 of FIG. 3 will be described as a representative.

In the license registration process, first in S505, the control section 11 accepts input of the license request information 260A. Then, in S510, the control section 11 decrypts the encrypted PC unique information and software information included in the license request information 260A.

Next in S515, the control section 11 determines whether or not the decrypted software information matches any software information pre-registered on the license managing table 110 in the memory unit 16. If not (S515:No), then the control section 11 proceeds to S545. One possible reason for a negative determination in S515 is that software information has been input in error. On the other hand, if so (S515:Yes), then the control section 11 determines in S520 whether or not any PC unique information is registered on the license managing table 110 in association with software information that matches the decrypted software information. If not (S520: No), this means that no PC 20 is currently licensed for use of the PC software corresponding to the software information, and the control section 11 proceeds to S525. On the other hand, if so (S520:Yes), then the control section 11 proceeds to S545. In S545, the control section 11 notifies the user A that the requested registration is not permitted by, for example, sending a message to the transmitter of the license request information 260A, displaying the message on the display 12 of the license registration device 10, or having the manager tell the user A the message.

In S525, the control section 11 sets a limiting period based on, for example, the reference time information included in the license request information 260A. Then in S530, the control section 11 generates the license information 120A that includes the expiration information indicating the limiting period set in S525, encrypted PC unique information, and encrypted software information. In S535, the control section 11 provides the license information 120A to the user A by, for example, sending the license information 120A to the transmitter of the license request information 260A, storing the license information 120A into a storage area in the storing unit 16 accessible to the user A, or displaying the license information 120A on the display 12 of the license registration device 10.

In S540, the control section 11 registers a license by registering the decrypted PC unique information on the license managing table 110 in association with the software information that matches the decrypted software information. Then, the control section 11 ends the license registration process.

Next, the license information setting process will be described with reference to the flowchart of FIG. 6. The license information setting process is executed by the control section 21 of the PC 20 for setting the license data 230 for the PC software installed on the PC 20 when a user inputs the license information 120 to the PC 20. In the timing chart of FIG. 3, the license information setting process is performed in S325 and S375. However, in the following, the license information setting process executed in the PC 20A in S325 will be described as a representative.

Figure 6:
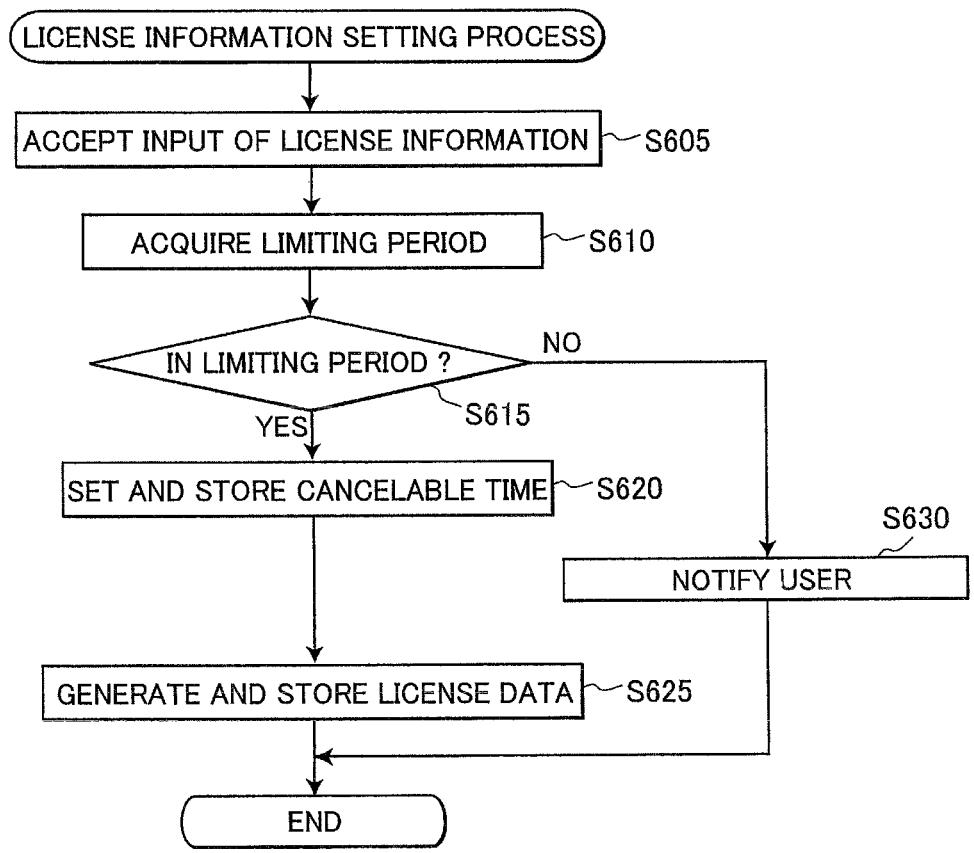
FIG. 6 is a flowchart representing a license information setting process according to the embodiment of the present invention.

As shown in FIG. 6, first in S605, the control section 21 of the PC 20A accepts input of the license information 120A from the user A. Then, in S610, the control section 21 acquires the limiting period indicated by the expiration information included in the license information 120A.

In S615, the control section 21 determines whether or not it is within the limiting period. If so (S615:Yes), then in S620, the control section 21 sets the cancelable time based on the limiting period, generates time information 222 indicating the cancelable time, and stores the time information 222 in association with the license information 120A into the memory unit 26. More specifically, the cancelable time is set to a time that is at or later than an expiration time of the limiting period. For example, the cancelable time may be exactly the expiration time of the limiting period. Alternatively, the cancelable time may be several days after the expiration time.

In S625, the control section 21 generates the license data 230A and stores the same into the memory unit 26. Note that the license data 230A may be a combination of the encrypted PC unique information and the encrypted software information. Then, the control section 21 ends the license information setting process.

Note that in S615 the control section 21 may also perform a process to decrypt the encrypted PC unique information and software information included in the license information 120A and to determine whether or not the decrypted PC unique information and software information match respectively the PC unique information 220 and the software information 215 of the PC 20A. This process ensures the license data 230A is generated in S625 for the PC software installed on the PC 20A.

If a negative determination is made in S615 (S615:No), then in S630, the control section 21 notifies the user A through the display 22 or the like that the limiting period for inputting the license information 120A has elapsed, and ends the license information setting process.

Figure 7:
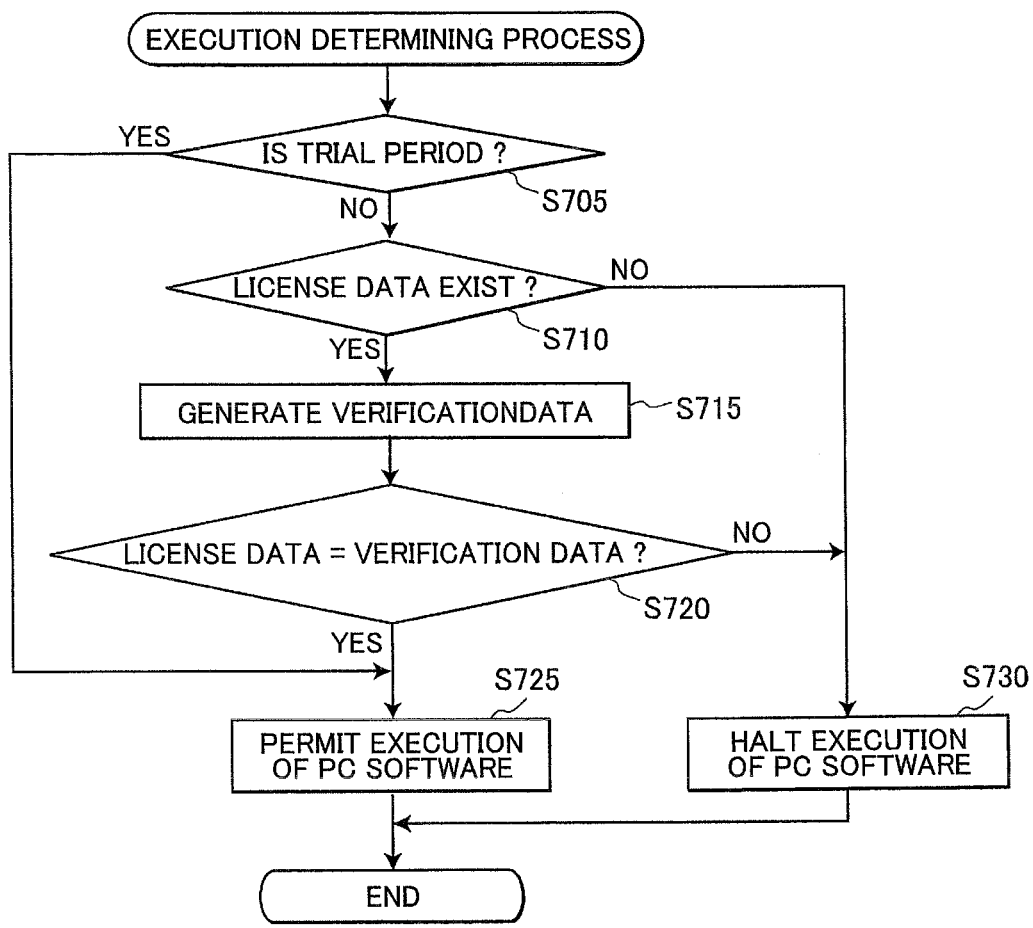
FIG. 7 is a flowchart representing an execution determining process according to the embodiment of the present invention.

Next, an execution determining process will be described with reference to the flowchart of FIG. 7. The execution determining process is executed by the control section 21 of the PC 20 installed with PC software when an activation command for the PC software is received.

In the execution determining process, first in S705, the control section 21 determines whether or not it is within the trial period. If so (S705:Yes), then the control section 21 proceeds to S725. On the other hand, if not (S705:No), then the control section 21 proceeds to S710.

In S710, the control section 21 determines whether or not the license data 230 is stored in the memory unit 26 of the PC 20. If so (S710:Yes), then the control section 21 proceeds to S715. On the other hand, if not (S710:No), then the control section 21 proceeds to S730.

In S715, the control section 21 generates the verification data 240 based on the software information 215 and the PC unique information 220 stored in the memory unit 26, and then in S720, the control section 21 determines whether or not the verification data 240 matches the license data 230 stored in the memory unit 26. If so (S720:Yes), then the control section 21 proceeds to S725. On the other hand, if not (S720: No), then the control section 21 proceeds to S730.

In S725, the control section 21 permits the execution of the PC software, and ends the execution determining process. On the other hand, in S730, the control section 21 halts execution of the PC software, and ends the execution determining process. In S730, the control section 21 may notify the user through the display 22 or the like that the user is not permitted to use the PC software either because the license for use of the PC software is not registered or because valid license data 230 is not stored.

The execution determining process may be performed each time the execution command for PC software is input to the PC 20 after the PC software is installed on the PC 20. Alternatively, if execution of PC software is once permitted in S725, then execution of the PC software may be automatically permitted later on without performing the execution determining process, until the PC software becomes unusable on the PC 20.

Next, the license cancel information providing process will be described with reference to the flowchart of FIG. 8. As described above, if the disabling instruction 130A is input to the PC 20A, for example, before the cancelable time, then part of the PC software 200 equivalent to the license cancel information providing section 210 remains executable on the PC 20A. The license cancel information providing process is executed by the control section 21 of the PC 20A at a predetermining timing if the disabling instruction 130A is input to the PC 20A before the cancelable time. However, if the disabling instruction 130A is input to the PC 20A after the cancelable time, then the license cancel information providing process is executed in the disabling process (S326 of FIG. 3, for example) for disabling the usage of the PC software 200.

In the license cancel information providing process, first in S805, the control section 21 determines whether or not the cancelable time has arrived. If not (S805:No), then the control process 21 ends the license cancel information providing process. On the other hand, if so (S805:Yes), then in S810, the control section 21 generates the license cancel information 265. The license cancel information 265 includes the encrypted software information and the encrypted PC unique information as described above.

Next in S815, the control section 21 provides the license cancel information 265 to a user by storing the same into a storage area in the memory unit 26 of the PC 20 accessible to the user. Then, the control section 21 ends the license cancel information providing process. Note that in S815 the control process 21 may instead provide the license cancel information 265 to the user by displaying the same on the display 22 of the PC 20, for example.

Next, the license cancel process executed in the license registration device 10 will be described with reference to the flowchart of FIG. 9. The license cancel process is executed when the license registration device 10 starts receiving the license cancel information 265 (in S355 of the timing chart of FIG. 3, for example). The license cancel information 265 may be sent from the online terminal and received through the network IT 15 or input by the manger or the like through manipulation of the license registration device 10.

In the license cancel process, first in S905, the control section 11 accepts the input of the license cancel information 265. Then, in S910, the control section 11 decrypts the encrypted PC unique information and software information included in the license cancel information 265.

Next, in S915, the control section 11 determines whether or not the decrypted software information matches any software information registered on the license managing table 110 stored in the memory unit 16. If not (S915:No), then the control section 11 ends the license cancel process. On the other hand, if so (S915:Yes), then in S920, the control section 11 determines whether or not the decrypted PC unique information is registered on the license managing table 110 in association with the software information that the encrypted software information matches. If not (S920:No), then the control section 11 ends the license cancel process. On the other hand, if so (S920:Yes), then in S925, the control section 11 cancels the license by deleting the PC unique information that is registered in association with the software information from the license managing table 110. Then, the control section 11 ends the license cancel process.

As described above, according to the present embodiment, a license for use of PC software is registered only if the license information 120 is input to the PC 20 within the limiting period indicated by the expiration information included in the license information 120 after the PC software is installed on the PC 20. Also, the license cancel information 265 is provided to a user only when or after the cancelable time has arrived, so the license can be canceled only when or after the cancelable time has arrived.

There may be a case where after having a license for use of PC software on the PC 20 canceled while saving corresponding license information 120, a user inputs the saved license information 120 to the PC 20 on which the same PC software is reinstalled. However, in this case, the limiting period has elapsed by the time the license becomes cancelable, so use of the PC software reinstalled on the PC cannot be permitted even if the user inputs the saved license information 120.

Also, even if the usage of the PC software is disabled within the limiting period, the license cannot be canceled before the cancelable time. Thus, a license for the PC software cannot be registered again unless the cancelable time arrives. As described above, the cancelable time arrives only when or after the limiting period elapses. Therefore, use of the PC software cannot be permitted when the saved license information 120 is input.

In this manner, the present embodiment can prevent misuse of PC software even if the license information 120 is saved.

Next, a modification of the above-described embodiment will be described. Note that in the following description, only parts differing from those of the above-described embodiment will be described.

In this modification, a time period in which the license cancel information 265 can be used is limited by using a registration time and a cancel time in the following manner.

Figure 5:
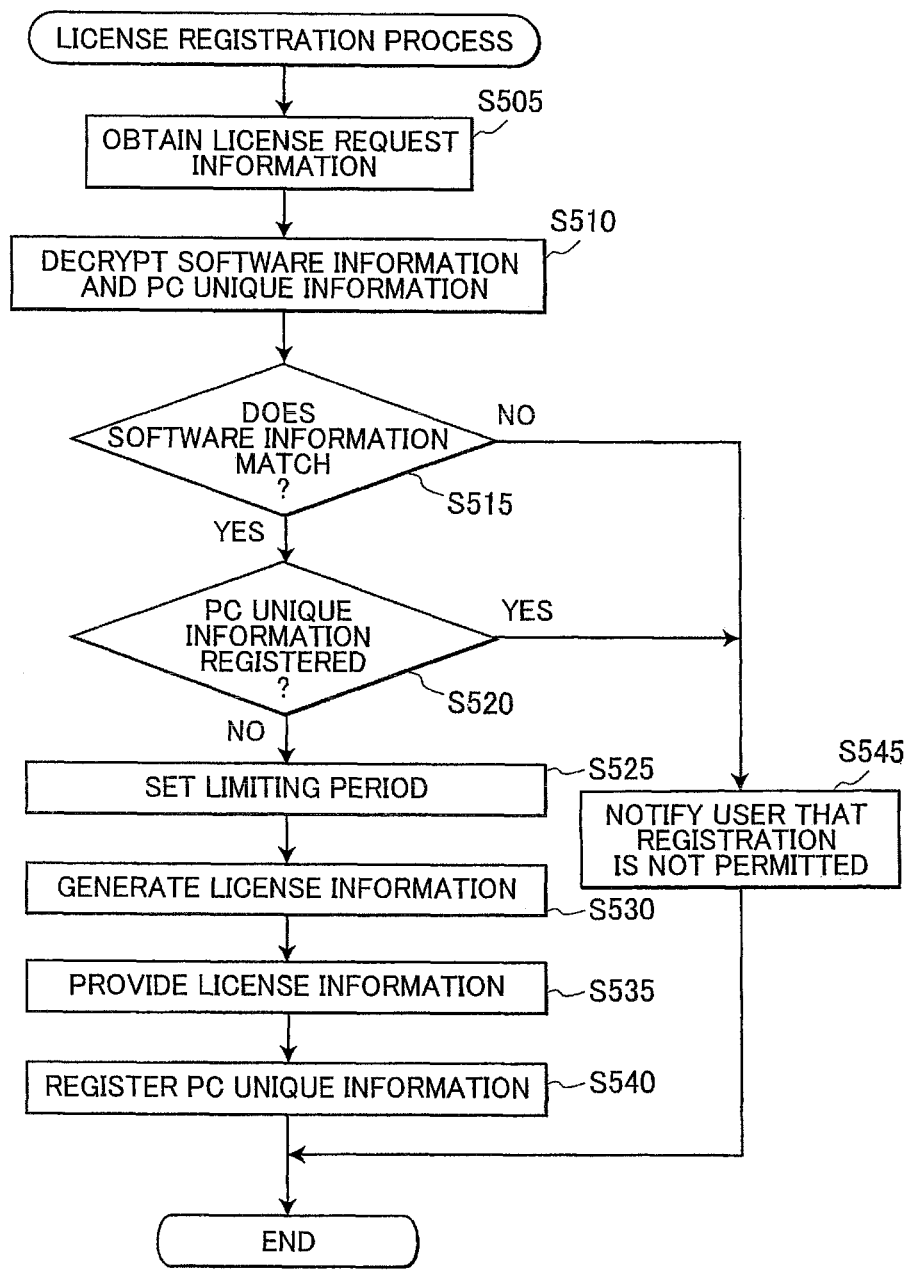
FIG. 5 is a flowchart representing a license registration process according to the embodiment of the present invention.

That is, in S540 of the license registration process shown in FIG. 5, the control section 11 of the license registration device 10 sets the registration time relating to the registration of the license information 120, and registers the same on the license managing table 110.

The registration time may be the time at which the corresponding PC unique information is registered on the license managing table 110, the time at which corresponding license request information 260 is received or generated, or the time at which corresponding PC software is installed on the PC 20, for example. In this case, the reference time information included in the license request information 260 may indicate the time at which the corresponding PC software is installed on the PC 20.

Figure 8:
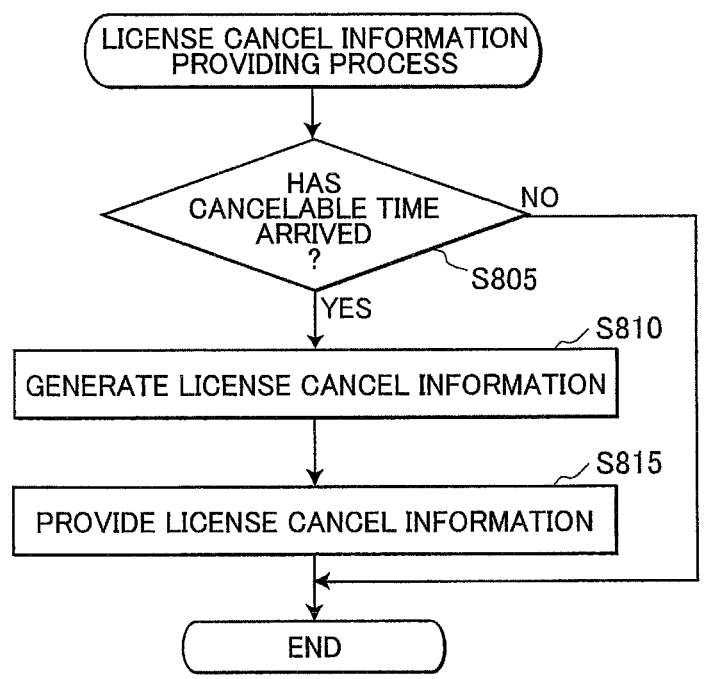
FIG. 8 is a flowchart representing a license cancel information providing process according to the embodiment of the present invention.

Also, in S810 of the license cancel information providing process shown in FIG. 8, the control section 21 of the PC 20 sets the cancel time and generates license cancel information 265 including the cancel time. The cancel time may be the cancelable time or the time at which the license cancel information 265 is generated.

Figure 9:
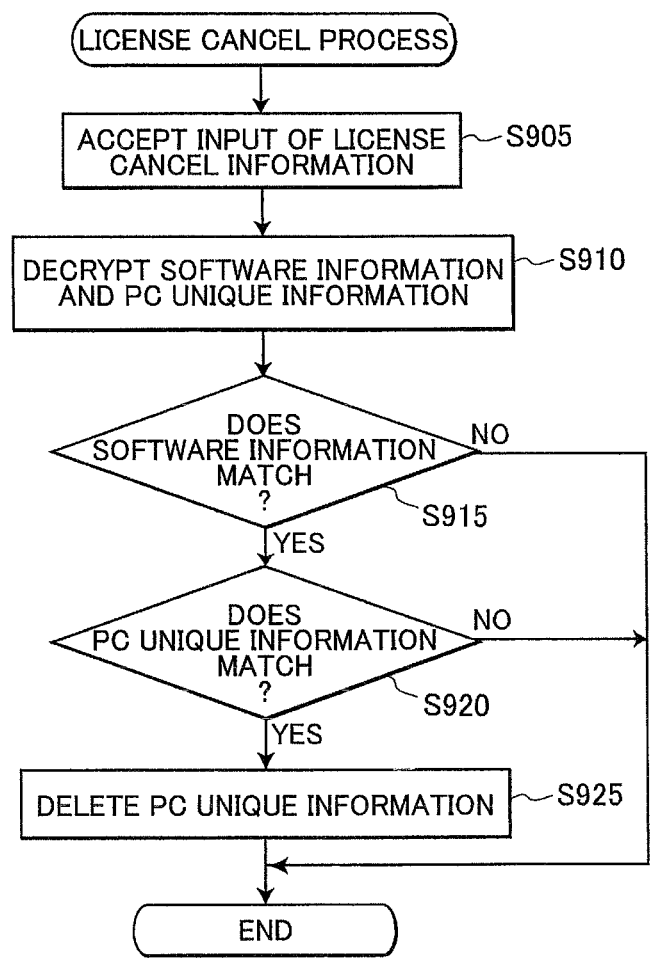
FIG. 9 is a flowchart representing a license cancel process according to the embodiment of the present invention.

Further, in the license cancel process in FIG. 9, the license registration device 10 determines whether or not the cancel time is after the registration time registered on the license managing table 110. More specifically, in S910 of FIG. 9, the control section 11 retrieves the cancel time included in the license cancel information 265 in addition to the process to decrypt the software information and the PC unique information. In S920, in addition to determining whether or not the PC unique information matches as described above, the control section 11 also determines whether or not the cancel time is after the registration time registered on the license managing table 110. If the cancel time is not after the registration time, then the control section 11 ends the license cancel process without deleting corresponding PC unique information from the license managing table 110.

That is, the license can be canceled only if the cancel time included in the license cancel information 265 is after the registration time registered on the license managing table 110.

Here, it is conceivable that after having a license for PC software canceled while saving corresponding license cancel information 265, a user obtains a license for the same PC software reinstalled on the PC 20 for some reason, and then inputs the saved license cancel information 265 to the PC 20. However, in this case, registration time registered at the time of the second-time license registration is later than cancel time included in the saved license cancel information 265. Thus, the license is not canceled by using the saved license cancel information 265.

While the invention has been described in detail with reference to the embodiment thereof, it would be apparent to those skilled in the art that various changes and modifications may be made therein without departing from the spirit of the invention.

For example, in the above described embodiment, only a single PC 20 can be licensed for use of one PC software. However, a plurality of predetermined number of PCs 20 may be licensed for use of one PC software. In this case, the control section 11 determines in S520 of FIG. 5 whether or not the predetermined number of entries of PC unique information are registered in association with the same software information. In this way, the plurality of predetermined number of PCs 20 can be permitted to use the same PC software.

Also, in the above-described embodiment, the disabling process is executed in S326 of FIG. 3 for disabling the usage of the PC software 200 on the PC 20A by changing the settings. However, the usage of the PC software 200 on the PC 20A may be disabled by actually uninstalling the PC software 200 from the PC 20A. In this case also, the part of the PC software 200 (equivalent to the license cancel information providing section 210 described above) remains on the PC 20A after the uninstallation.

What is claimed is:

1. A system comprising:
    a data processing device having a memory configured to store first computer readable instructions comprising a set of program instructions configured to become executable in the data processing device under a condition where license information is input to the data processing device within a particular time period set in association with the license information; and
    a license registration device configured to provide the license information in response to a registration process of a license for use of the program instructions in the data processing device, the license registration device comprising a memory configured to store second computer readable instructions,
    wherein the first computer readable instructions, when executed by the data processing device, cause the data processing device to implement:
        determining a cancelable time as a time beyond an expiration time of the particular time period;
        storing, in the data processing device, the cancelable time in association with the license information;
        accepting input of a disabling command;
        disabling use of the program instructions upon accepting the input of the disabling command;
        generating license cancel information usable for canceling the license only when both arrival of the cancelable time and acceptance of the disabling command occur;
        determining a cancel time in association with the license cancel information, the cancel time being related to time when the license cancel information is generated; and
        outputting the license cancel information and the cancel time, and
    wherein the second computer readable instructions, when executed by the license registration device, cause the license registration device to implement:
    accepting a license request for use of the program instructions in the data processing device;
    issuing the license information and the particular time period in association with the license information;
    registering the license information in association with information of the data processing device which issued the license request;
    determining a registration time in response to registering the license information, the registration time including a time relative to the registration process;
    storing, in the license registration device, the registration time in association with the license information;
    accepting input of the license cancel information and the cancel time; and
    disabling the license information in association with the license cancel information only when the accepted cancel time is beyond the stored registration time.

2. The system according to claim 1, wherein if a disable instruction to disable usage of the program instructions is input to the data processing device before a time for disabling use of the program instructions arrives, the first computer readable instructions cause the data processing device to generate the license cancel information.

3. The system according to claim 2, wherein if the disable instruction is input to the data processing device before the time for disabling use of the program instructions arrives, the first computer readable instructions cause the data processing device to generate the license cancel information at a predetermined timing.

4. The system according to claim 1, wherein the first computer readable instructions further cause the data processing device to implement:
    enabling execution of the program instructions in the data processing device upon input of the license information; and
    determining the cancelable time when enabling the execution of the program instructions.

5. The system according to claim 1, wherein the first computer readable instructions further cause the data processing device to implement:
    outputting the license cancel information to enable a user to provide the license cancel information to the license registration device.

6. The system according to claim 1, wherein the first computer readable instructions further cause the data processing device to implement:
    generating license request information for requesting the license registration device for the license information, the license request information being generated upon accepting a user command for requesting the license information.

7. The system according to claim 6, wherein the first computer readable instructions further cause the data processing device to implement:
    outputting the license requesting information for enabling a user to provide the license requesting information to the license registration device.

8. A method implemented in a system comprising:
    a data processing device having a memory configured to store first computer readable instructions comprising a set of program instructions configured to become executable in the data processing device under a condition where license information is input to the data processing device within a particular time period set in association with the license information; and
    a license registration device configured to provide the license information in response to a registration process of a license for use of the program instructions in the data processing device, the license registration device comprising a memory configured to store second computer readable instructions, wherein steps implemented in the data processing device comprise:
- determining a cancelable time as a time beyond an expiration time of the particular time period;
- storing, in the data processing device, the cancelable time in association with the license information;
- accepting input of a disabling command;
- disabling use of the program instructions upon accepting the input of the disabling command;
- generating license cancel information usable for canceling the license only when both arrival of the cancelable time and acceptance of the disabling command occur;
- determining a cancel time in association with the license cancel information, the cancel time being related to time when the license cancel information is generated; and
- outputting the license cancel information and the cancel time, and wherein steps implemented in the license registration device comprise:
- accepting a license request for use of the program instructions in the data processing device;
- issuing the license information and the particular time period in association with the license information;
- registering the license information in association with information of the data processing device which issued the license request;
- determining a registration time in response to registering the license information, the registration time including a time relative to the registration process;
- storing, in the license registration device, the registration time in association with the license information;
- accepting input of the license cancel information and the cancel time; and
- disabling the license information in association with the license cancel information only when the accepted cancel time is beyond the stored registration time.

9. The method according to claim 8, wherein if a disable instruction to disable usage of the program instructions is input to the data processing device before a time for disabling use of the program instructions arrives, the steps implemented in the data processing device comprise: generating the license cancel information.

10. The method according to claim 9, wherein if the disable instruction is input to the data processing device before the time for disabling use of the program instructions arrives, the steps implemented in the data processing device comprise: generating the license cancel information at a predetermined timing.

11. The method according to claim 8, wherein the steps implemented in the data processing device comprise:
- enabling execution of the program instructions in the data processing device upon input of the license information; and
- determining the cancelable time when enabling the execution of the program instructions.

12. The method according to claim 8, wherein the steps implemented in the data processing device comprise:
- outputting the license cancel information to enable a user to provide the license cancel information to the license registration device.

13. The method according to claim 8, wherein the steps implemented in the data processing device comprise:
- generating license request information for requesting the license registration device for the license information, the license request information being generated upon accepting a user command for requesting the license information.

14. The method according to claim 13, wherein the steps implemented in the data processing device comprise:
- outputting the license request information for enabling a user to provide the license request information to the license registration device.

* * * * *